(12) United States Patent
Ban

(10) Patent No.: US 11,417,016 B2
(45) Date of Patent: Aug. 16, 2022

(54) ARTICLE-FOR-POSTING MANAGEMENT SYSTEM AND NON-TRANSITORY COMPUTER READABLE MEDIUM

(71) Applicant: FUJIFILM BUSINESS INNOVATION CORP., Tokyo (JP)

(72) Inventor: Masashi Ban, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 180 days.

(21) Appl. No.: 16/458,245

(22) Filed: Jul. 1, 2019

(65) Prior Publication Data

US 2020/0020128 A1    Jan. 16, 2020

(30) Foreign Application Priority Data

Jul. 10, 2018  (JP) .............................. JP2018-130441

(51) Int. Cl.
| | |
|---|---|
| *G06T 7/00* | (2017.01) |
| *G06T 7/70* | (2017.01) |
| *G06T 7/73* | (2017.01) |
| *G06V 10/20* | (2022.01) |
| *G06V 10/24* | (2022.01) |
| *G06V 20/52* | (2022.01) |

(52) U.S. Cl.
CPC ................. *G06T 7/74* (2017.01); *G06T 7/97* (2017.01); *G06V 10/242* (2022.01); *G06V 10/255* (2022.01)

(58) Field of Classification Search
None
See application file for complete search history.

(56) References Cited

U.S. PATENT DOCUMENTS

| | | | | |
|---|---|---|---|---|
| 9,271,121 | B1* | 2/2016 | McDonnell | H04W 4/029 |
| 11,080,336 | B2* | 8/2021 | Van Dusen | G06Q 50/01 |
| 2003/0006911 | A1* | 1/2003 | Smith | G08G 1/20 |
| | | | | 340/988 |
| 2012/0066057 | A1* | 3/2012 | Ramer | G06Q 30/0247 |
| | | | | 705/14.46 |
| 2015/0117788 | A1* | 4/2015 | Patel | G06Q 10/087 |
| | | | | 382/199 |
| 2015/0287045 | A1* | 10/2015 | Brown | H04L 43/067 |
| | | | | 705/14.4 |
| 2017/0178060 | A1* | 6/2017 | Schwartz | G06K 9/6267 |
| 2018/0109928 | A1* | 4/2018 | Walden | H04W 4/023 |

(Continued)

FOREIGN PATENT DOCUMENTS

| | | |
|---|---|---|
| JP | 2014-48752 A | 3/2014 |
| JP | 2016-224528 A | 12/2016 |
| JP | 2017-014014 A | 1/2017 |

OTHER PUBLICATIONS

May 17, 2022 Office Action issued in Japanese Patent Application No. 2018-130441.

*Primary Examiner* — Soo Shin
(74) *Attorney, Agent, or Firm* — Oliff PLC

(57) ABSTRACT

An article-for-posting management system includes: a storage unit that stores an article for posting and a position at which the article for posting is to be posted in association with each other; an obtaining unit that obtains the position of the article for posting which is posted; and an output unit that, when there is a difference between information stored by the storage unit and information obtained by the obtaining unit, outputs presence of the difference.

11 Claims, 15 Drawing Sheets

(56) References Cited

U.S. PATENT DOCUMENTS

2019/0002201 A1* 1/2019 Yamashita ............. B65G 1/137
2019/0215424 A1* 7/2019 Adato ................... G06Q 50/28
2019/0340649 A1* 11/2019 Ayush ............... G06Q 30/0261
2020/0020128 A1* 1/2020 Ban ................... G06K 9/00771

* cited by examiner

FIG. 4

| PRODUCT CODE | PRODUCT NAME | SALES COPY | PRICE | POP SPECIFICATION | DESIGN SET | POP POSITIONAL INFORMATION | POP ISSUE DATE | POSTING EXPIRATION DATE |
|---|---|---|---|---|---|---|---|---|
| 0000 | CHOCO PIE | FOR HALLOWEEN | 278 | A4 × 1<br>A5 × 3 | NORMAL SALE | 021-4 | 2018/3/1 | 2018/5/31 |
| 0001 | COOKIE | VERY POPULAR!! | 312 | A5H × 4 | SPECIAL SALE | 021-1 | 2018/3/1 | 2018/3/31 |
| 0002 | RICE CRACKERS | AFFORDABLE | 150 | A5H × 2 | NORMAL SALE | 030-6 | 2018/3/1 | 2018/5/31 |
| 0003 | CUP RAMEN | REFRESHING | 200 | A5 × 1<br>A6 × 1 | NORMAL SALE | 035-1 | 2018/2/15 | NONE |
| ... | ... | ... | ... | ... | ... | ... | ... | ... |

FIG. 7

| PRODUCT NAME | POSTING POSITION | INAPPROPRIATE ITEMS |
|---|---|---|
| CHOCO PIE | 021-4 | PRICE |
| COOKIE | 021-1 | EXPIRED |

THERE WERE INAPPROPRIATE POP LABELS.

PRINT LIST    OK

FIG. 9

THERE WERE INAPPROPRIATE POP LABELS.

| | 021 | |
|---|---|---|
| | 624 | |
| | 360 | |
| (1) | 328 | |
| | 210 | |
| | 105 | |
| (2) | 312 | |

(1) CHOCO PIE  PRICE
(2) COOKIE    EXPIRED

PRINT    OK

FIG. 10

| | PRODUCT NAME | POP SPECIFICATION | DESIGN SET |
|---|---|---|---|
| (1) | CHOCO PIE | A4 × 1<br>A5 × 3 | NORMAL SALE |
| (2) | COOKIE | A5H × 4 | NORMAL SALE |

PLEASE PRINT THE FOLLOWING POP LABELS.

PRINT  OK

FIG. 11

THERE WERE UNNECESSARY POP LABELS. PLEASE REMOVE THE FOLLOWING POP LABELS.

| 021 | 022 | 023 | 024 | 025 | 026 | 027 |
|-----|-----|-----|-----|-----|-----|-----|
| | | | | | | 028 |
| | | | | | | 029 |
| | | | | | | 030 |
| | | | | | | 031 |
| 036 | 035 | 034 | 033 | 032 | | |

(1)
(2)

(1) FURIKAKE
(2) YAKITORI

PRINT  OK

FIG. 12

THERE WAS INCORRECT POP LABEL. PLEASE CHANGE THE FOLLOWING POP LABEL.

| 021 | 022 | 023 | 024 | 025 | 026 | 027 |
|-----|-----|-----|-----|-----|-----|-----|
|     |     |     |     |     |     | 028 |
|     |     |     |     |     |     | 029 |
|     |     |     |     |     |     | 030 |
|     |     |     |     |     |     | 031 |
|     |     |     |     |     |     | 032 |
|     |     |     |     |     |     | 033 |
|     |     |     |     |     |     | 034 |
|     |     |     |     |     |     | 035 |
| 036 |     |     |     |     |     |     |

(1)

(1) GYOZA SKIN

PRINT    OK

FIG. 14

| POP LABEL IS TILTED. PLEASE AFFIX THE POP LABEL AGAIN. |||
|---|---|---|
| | 021 | (1) CHOCO PIE |
| | 624 | |
| | 360 | |
| (1) | 278 | |
| | 210 | |
| | 105 | |
| | 312 | |
| | | PRINT    OK |

ARTICLE-FOR-POSTING MANAGEMENT SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-130441 filed Jul. 10, 2018.

BACKGROUND

(i) Technical Field

The present disclosure relates to an article-for-posting management system and a non-transitory computer readable medium.

(ii) Related Art

Japanese Unexamined Patent Application Publication No. 2014-48752 describes a display label processing system that includes: a storage that stores label identification information assigned to each of display labels and information displayed on each display label in association with each other; a generator that generates a display label on which the label identification information and the information displayed on the display label are displayed; an imager that captures an image of a display label posted; and a controller that, when a display label is captured by the imager, performs management processing on the display label based on the label identification information of the captured display label.

Japanese Unexamined Patent Application Publication No. 2016-224528 describes an information processing system that includes a mobile terminal including an information processing device and an imaging unit. The information processing device has a storage unit that stores at least product information on a product and a posting end date of advertisement corresponding to the product; an identifying unit that identifies a color code corresponding to the posting end date stored in the storage unit; and a production unit that produces an advertisement using the color code identified by the identifying unit and product information which is stored in the storage unit and corresponds to the color code.

SUMMARY

At the sales counters in a shop, articles for posting such as point of purchase advertising (POP) advertisements are often posted to promote the sale of products. However, when a POP advertisement is not posted at the right position for posting or a POP advertisement is posted at a wrong position for posting, it is difficult to find such an error.

Aspects of non-limiting embodiments of the present disclosure relate to an article-for-posting management system that recognizes that an article for posting to be posted is posted at the right position for posting.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an article-for-posting management system including: a storage unit that stores an article for posting and a position at which the article for posting is to be posted in association with each other; an obtaining unit that obtains the position of the article for posting which is posted; and an output unit that, when there is a difference between information stored by the storage unit and information obtained by the obtaining unit, outputs presence of the difference.

BRIEF DESCRIPTION OF THE DRAWINGS

Exemplary embodiment of the present disclosure will be described in detail based on the following figures, wherein:

FIG. 4 is a table for explaining the contents of advertising management DB;

FIG. 7 is a view illustrating a first screen example that notifies of inappropriate advertisements;

FIG. 9 is a view illustrating a third screen example that notifies of inappropriate advertisements;

FIG. 10 is a view illustrating a screen example that proposes to print POP advertisements for replacement;

FIG. 11 is a view illustrating a screen example that notifies of unnecessary advertisements;

FIG. 12 is a view illustrating a screen example that notifies of an incorrect advertisement;

FIG. 14 is a view illustrating a screen example that notifies of an advertisement posted in an improper manner.

DETAILED DESCRIPTION

Hereinafter, an exemplary embodiment of the present disclosure will be described in detail with reference to the accompanying drawings.

[POP Advertising Management System]

Figure 1:
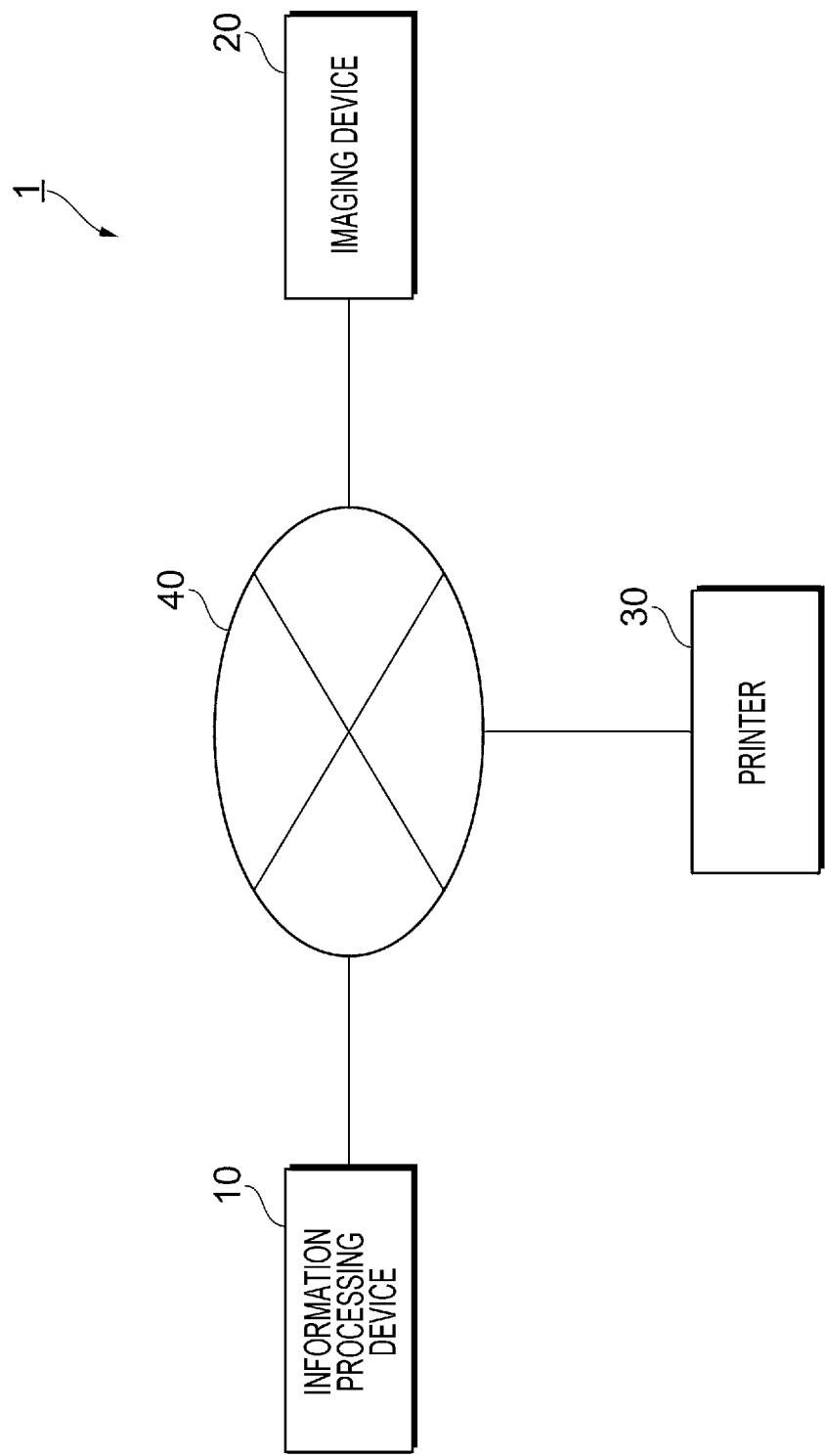
FIG. 1 is a diagram illustrating an overall configuration example of point of purchase advertising (POP) advertising management system in an exemplary embodiment of the present disclosure.

FIG. 1 is a diagram illustrating an overall configuration example of a POP advertising management system 1 in the exemplary embodiment of the present disclosure.

The POP advertising management system 1 in the exemplary embodiment is for managing POP advertisements which are advertising media for sales promotion primarily used in a shop such as a supermarket. POP advertisement as an example of an article for posting is normally posted inside or at the front of a shop along with products for sales promotion.

The POP advertising management system 1 includes an information processing device 10 that executes various types of processing related to management of POP advertisement;

an imaging device 20 that captures an image of the inside a shop; a printer 30 that outputs various printed materials including POP advertisement under the control of the information processing device 10; and a network 40 that connects the information processing device 10, the imaging device 20, and the printer 30. However, when the printer 30 has the function as a local printer, a configuration may be adopted in which the printer 30 is directly connected to the information processing device 10 not via the network 40.

[Hardware Configuration of Information Processing Device]

Figure 2:
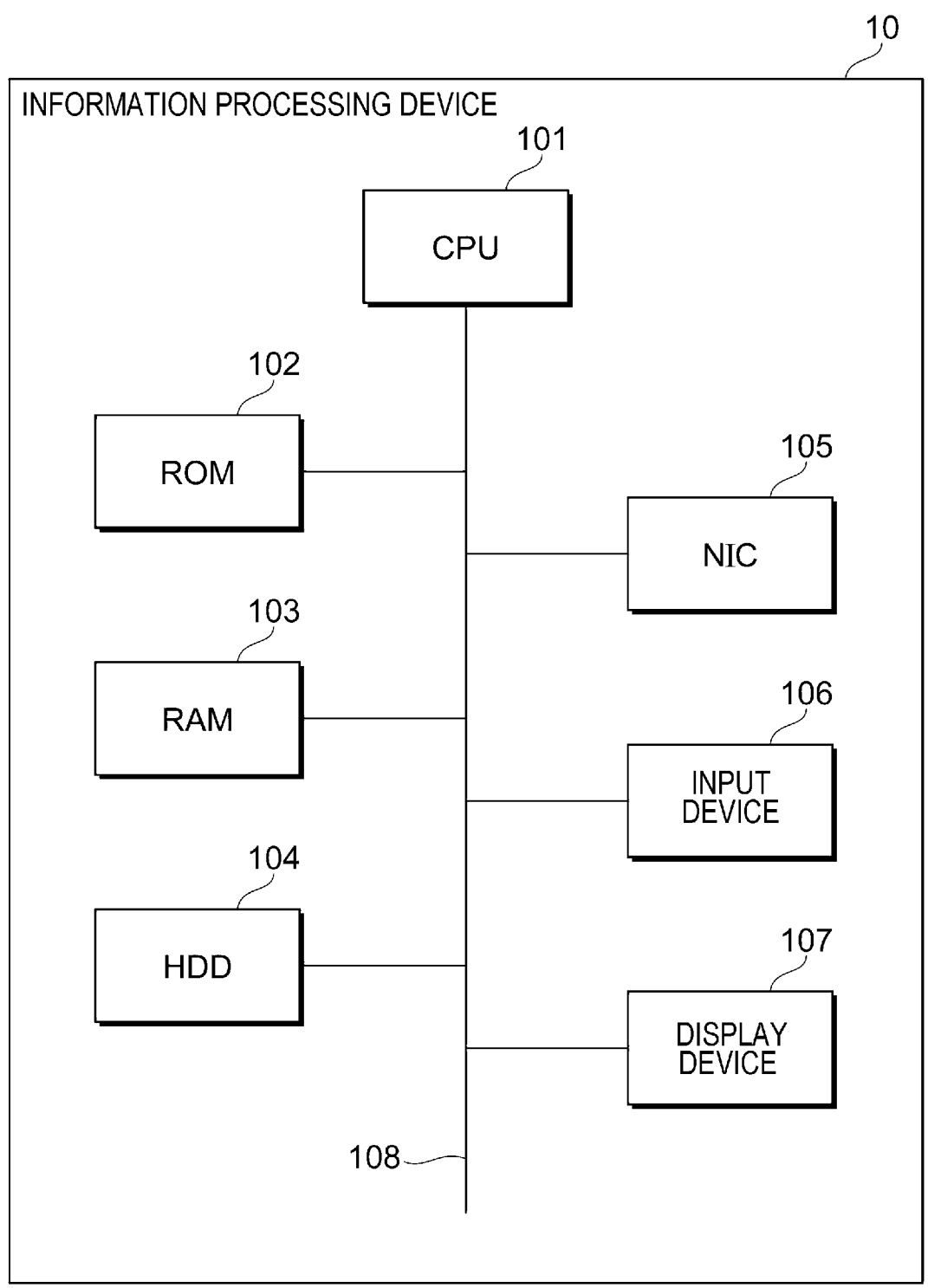
FIG. 2 is a diagram illustrating the hardware configuration of an information processing device.

FIG. 2 is a diagram illustrating the hardware configuration of the information processing device 10.

The information processing device 10 includes a central processing unit (CPU) 101 that reads and executes a program such as an OS and various applications; a read only memory (ROM) 102 that stores programs executed by the CPU 101 and data used when a program is executed; and a random access memory (RAM) 103 that stores data temporarily generated when a program is executed. In addition, the information processing device 10 further includes a hard disk drive (HDD) 104 that stores various programs and various types of data as an example of a storage unit; a network interface card (NIC) 105 that transmits and receives data between devices (for instance, the imaging device 20 and the printer 30) provided externally of the information processing device 10; an input device 106 that receives an input from an operator; a display device 107 that displays an image on a display screen; and a bus 108 that connects the above-mentioned components. Programs executed by the CPU 101 provided in the information processing device 10 may be previously stored in the ROM 102 or the HDD 104, or alternatively, may be stored, for instance, in a storage medium such as a CD-ROM to be provided to the CPU 101, or may be provided to the CPU 101 not via a network (not illustrated).

[Functional Configuration of Information Processing Device]

Figure 3:
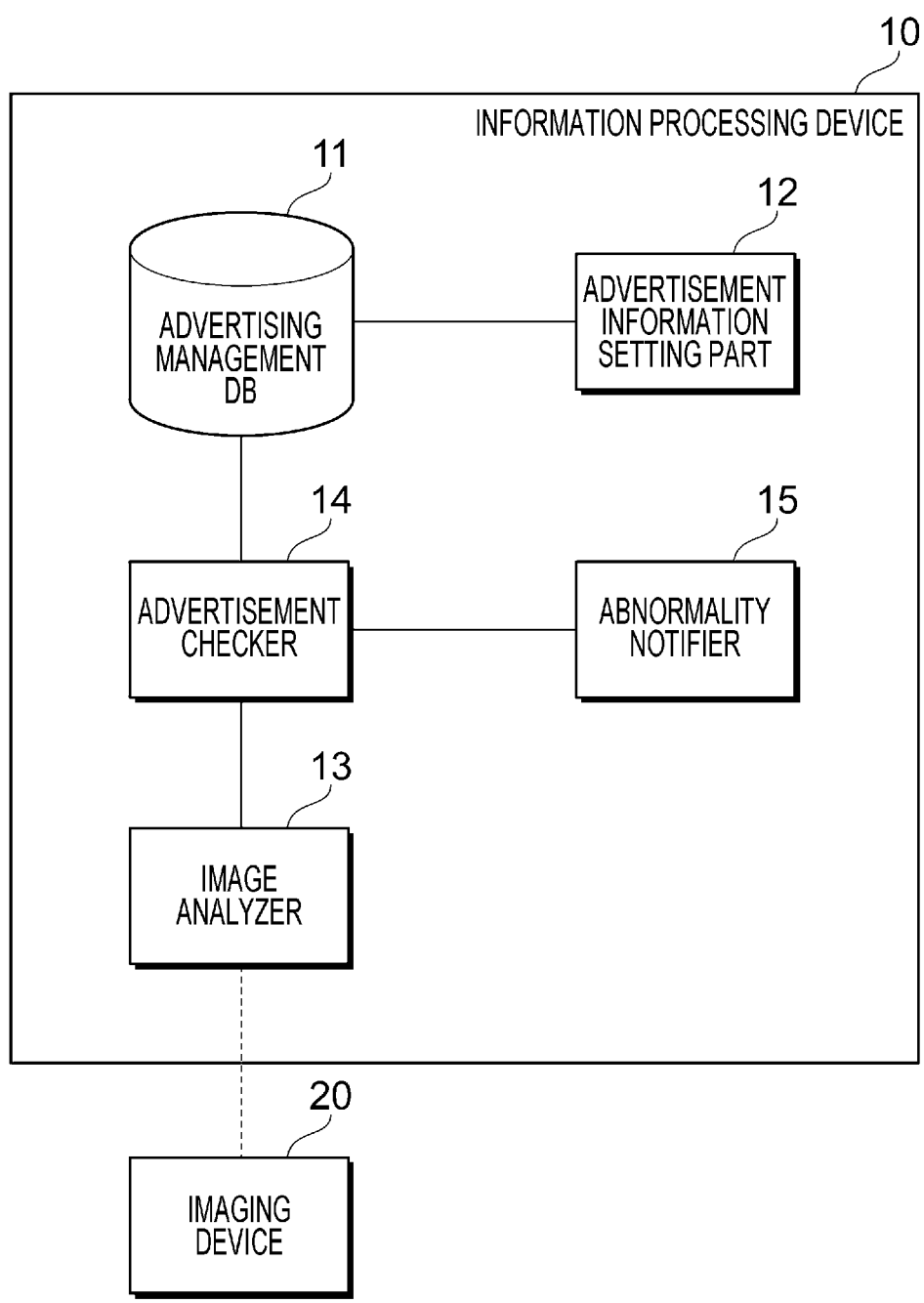
FIG. 3 is a diagram illustrating the functional configuration of the information processing device.

FIG. 3 is a diagram illustrating the functional configuration of the information processing device 10. It is to be noted that the imaging device 20 is also illustrated in FIG. 3.

The information processing device 10 includes advertising management data base (hereinafter referred to as an advertising management DB) 11, an advertisement information setting part 12, an image analyzer 13, an advertisement checker 14, and an abnormality notifier 15.

(Advertising Management DB)

The advertising management DB 11 as an example of stored information associates various types of data with each other which are used for managing POP advertisement posted in a shop, and stores the various types of data as a database.

FIG. 4 is a table for explaining the contents of the advertising management DB 11.

The advertising management DB 11 in the exemplary embodiment is configured by product name, sales copy, price, POP specification, design set, POP positional information, POP issue date, and posting expiration date which are associated with each product code (each product). For instance, '0000' as "product code" is associated with 'chocolate pie' as "product name", 'for Halloween' as "sales copy", '278' (yen) as "price", 'A4×1, A5×3' as "POP specification", 'normal sale' as "design set", '021-4' as "POP positional information", '2018/3/1' as "POP issue date", '2018/5/31' as "posting expiration date". Also, '0001' as "product code" is associated with 'cookie' as "product name", 'very popular!!' as "sales copy", '312' (yen) as "price", 'A5H×4' as "POP specification", 'special sale' as "design set", '021-1' as "POP positional information", '2018/3/1' as "POP issue date", '2018/3/31' as "posting expiration date". In addition, '0002' as "product code" is associated with 'rice crackers' as "product name", 'affordable' as "sales copy", '150' (yen) as "price", 'A5H×2' as "POP specification", 'normal sale' as "design set", '030-6' as "POP positional information", '2018/3/1' as "POP issue date", '2018/5/31' as "posting expiration date". Furthermore, '0003' as "product code" is associated with 'cup ramen' as "product name", 'refreshing' as "sales copy", '200' (yen) as "price", 'A5×1, A6×1' as "POP specification", 'normal sale' as "design set", '035-1' as "POP positional information", '2018/2/15' as "POP issue date", 'none' as "posting expiration date".

Among these, "product code" and "product name" are unambiguously defined for each product. The "sales copy" is an advertising copy attached to a product to promote the sale of the product, and may vary with the seasons. The "price" of a product is determined to sell the product at a right price, and may be changed (increased in price or decreased in price) due to various reasons. The "POP specification" indicates the sheet size and the number of sheets of POP advertisement printed to promote the sale of the product, and may be changed (increased in size, decreased in size, changed in the number of sheets) due to various reasons. The "design set" indicates the design of POP advertisement printed to promote the sale of the product, and may be changed due to various reasons. In this example, two types of sale: 'special sale' and 'normal sale' are provided as the "design set". The "POP positional information" indicates the position in a shop, where the POP advertisement of the product is to be posted. The details of the POP positional information will be described later. The "POP issue date" indicates the date (year, month, day) when POP advertisement of the product was posted in a shop. The "posting expiration date" indicates the date (year, month, day) until which POP advertisement of the product is posted. In this example, products ('chocolate pie', 'cookie', and 'rice crackers') for which a posting expiration date is set, and products ('cup ramen') for which a posting expiration date is not set coexist.

In the exemplary embodiment, among the above-mentioned items, at least "product name", "sales copy", "price", and "posting expiration date" are displayed on POP advertisement actually posted. The sheet size of POP advertisement to be printed is determined based on the "POP specification". In the "POP specification" illustrated in FIG. 4, 'A4', 'A5', and 'A6' respectively indicate A4 size, A5 size, A6 size defined in JIS, and 'A5H' indicates the half size of A5 size (not A6, but is the size obtained by cutting A5 size in a horizontally long manner).

(Advertisement Information Setting Part)

Returning to FIG. 3, the description is continued.

The advertisement information setting part 12 sets information on various types of POP advertisement, which is stored in the advertising management DB 11 based on an input by a worker who operates the input device 106 (see FIG. 2) provided in the information processing device 10. More specifically explained, the advertisement information setting part 12 accesses to the advertising management DB 11, and sets a product code, a product name, a sales copy, a price, a POP specification, a design set, POP positional information, a POP issue date, and a posting expiration date.

(Image Analyzer)

The image analyzer 13 performs image analysis on the data captured in a shop, inputted from the imaging device 20, that is, an image of a shop. More specifically explained, the image analyzer 13 analyzes the image of a shop captured by the imaging device 20, and retrieves the contents of each POP advertisement, and the posting position. In the exemplary embodiment, data including the description of one POP advertisement and the position where the POP advertisement is actually posted, obtained by image analysis performed by the image analyzer 13, is referred to as advertisement data. Here, the advertisement data is an example of obtained information.

(Advertisement Checker)

The advertisement checker 14 as an example of an obtaining unit checks to see whether various types of POP advertisement stored in the advertising management DB 11 match various types of POP advertisement analyzed by the image analyzer 13. As an example in which the POP advertisement stored in the advertising management DB 11 does not match the POP advertisement analyzed by the image analyzer 13, for instance, a POP advertisement to be posted is not posted at the right position for posting, and a POP advertisement which is not to be posted is posted at the position not for posting.

(Abnormality Notifier)

When the advertisement checker 14 identifies unmatched POP advertisements, the abnormality notifier 15 as an example of an output unit notifies a worker that abnormality has occurred in the POP advertisement.

[Imaging Device]

Figure 5A:
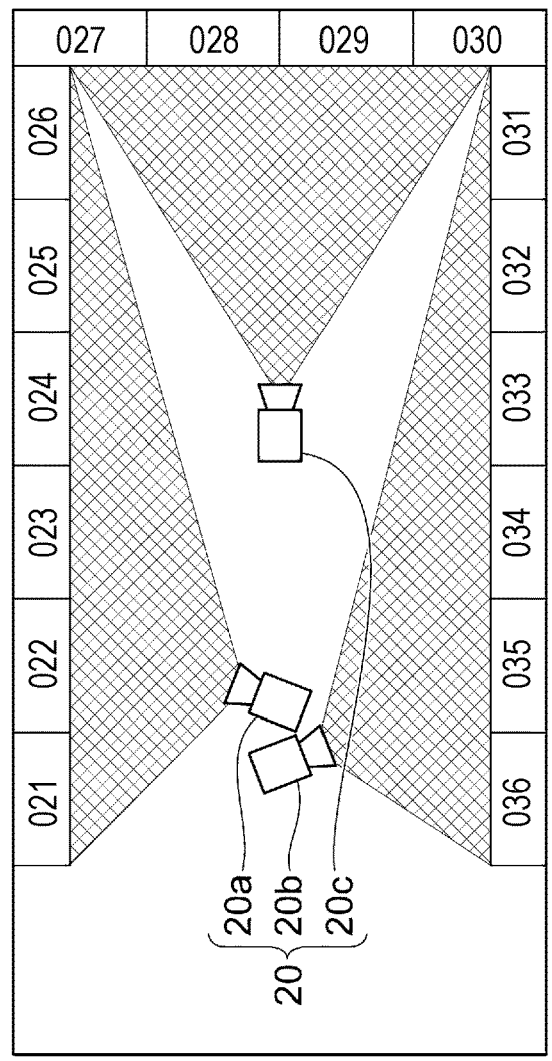
FIGS. 5A and 5B are views for explaining an imaging device.
Figure 5B:
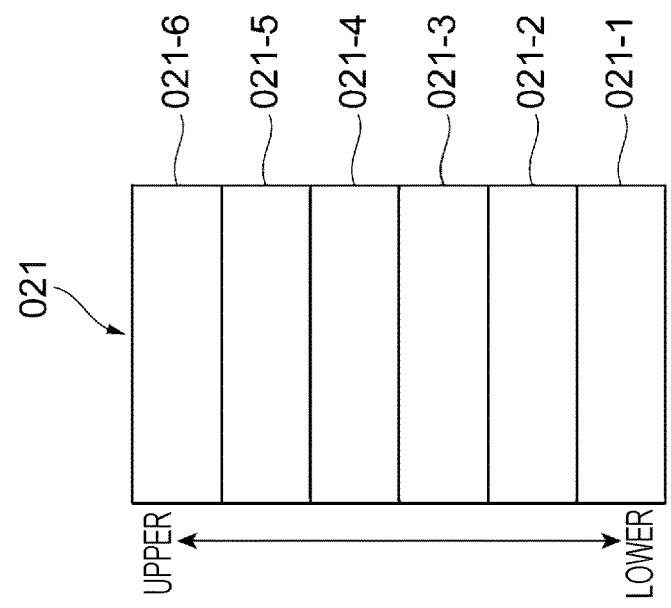

FIGS. 5A and 5B are views for explaining the imaging device 20. FIG. 5A illustrates a relationship between the layout of a shop and an the imaging device 20. FIG. 5B illustrates the structure of a showcase 021 which is installed in a shop and used for display of various products and posting of POP advertisement.

First, as illustrated in FIG. 5A, showcases 021 to 036 for displaying various products are provided along the wall surfaces on three sides in a shop. First, on the first wall surface, six showcases 021 to 026 are arranged side by side. On the second wall surface adjacent to the first wall surface, four showcases 027 to 030 are arranged side by side. Furthermore, on the third wall surface adjacent to the second wall surface and opposed to the first wall surface, six showcases 031 to 036 are arranged side by side.

The imaging device 20 in the exemplary embodiment includes a first monitoring camera 20a, a second monitoring camera 20b, and a third monitoring camera 20c that have a function of capturing a video or a still image, and monitor the inside of a shop. Among these, the first monitoring camera 20a captures an image of the showcases 021 to 026 provided along the first wall surface. The second monitoring camera 20b captures an image of the showcases 027 to 030 provided along the second wall surface. Furthermore, the third monitoring camera 20c captures an image of the showcases 031 to 036 provided along the third wall surface.

As illustrated in FIG. 5B, the showcase 021 has six shelves 021-1 to 021-6 which are arranged side by side in a vertical direction. In the following description, the shelf located in the lowermost is referred to as a first shelf 021-1, the shelf located on the first shelf 021-1 is referred to as a second shelf 021-2, and the shelf located on the second shelf 021-2 is referred to as a third shelf 021-3. The shelf located on the third shelf 021-3 is referred to as a fourth shelf 021-4, the shelf located on the fourth shelf 021-4 is referred to as a fifth shelf 021-5, and the shelf located at the uppermost level is referred to as a sixth shelf 021-6. In this example, a description is given under the assumption that one type of product is displayed on one shelf. In this example, it is assumed that other showcases 022 to 036 also have the same six-stage structure as that of the showcase 021 illustrated in FIG. 5B.

Here, the 'chocolate pie' as "product name" of "product code" of '0000', for instance, illustrated in FIG. 4 should be displayed on the fourth shelf 021-4 of the showcase 021, and the POP advertisement of the product should also be posted on the fourth shelf 021-4 of the showcase 021.

[Printer]

The printer 30 outputs various printed materials including POP advertisement by printing a monochrome image or a full-color image on a recording material such as a sheet. As the printer 30, for instance, a printer that adopts the xerography system or a printer that adopts the inkjet system may be used.

[Posting Management Processing]

Figure 6:
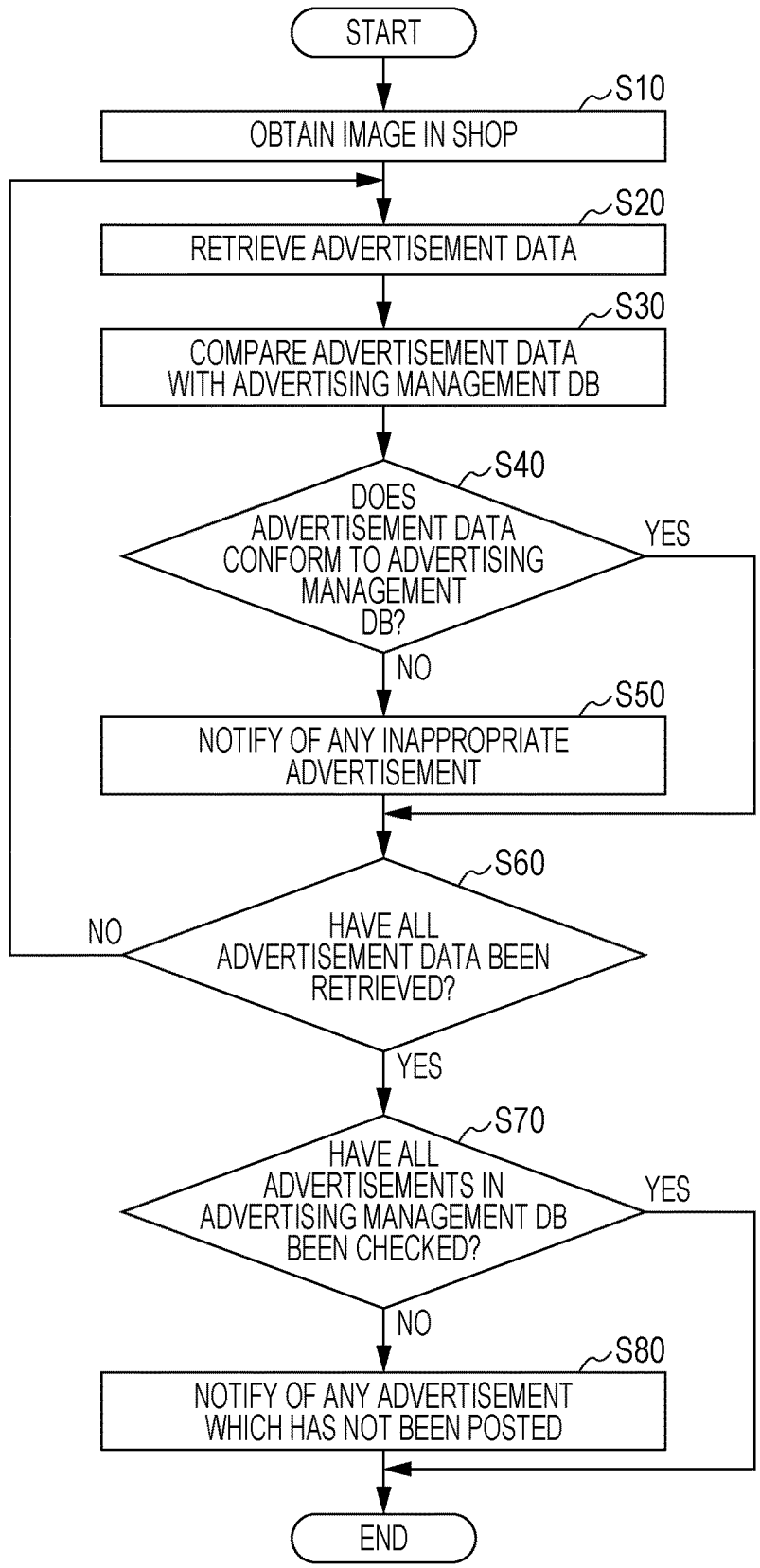
FIG. 6 is a flowchart illustrating the steps of POP advertisement presentation management processing.

FIG. 6 is a flowchart illustrating the steps of POP advertisement posting management processing in the exemplary embodiment. The processing illustrated in FIG. 6 is executed by the information processing device 10.

In the processing, first, the image analyzer 13 obtains an image of a shop obtained by capturing an image of a shop with the first monitoring camera 20a to the third monitoring camera 20c included in the imaging device 20 (step 10). Next, the image analyzer 13 analyzes the image of the shop obtained in step 10, and retrieves advertisement data related to one POP advertisement from the image of the shop (step 20).

Subsequently, the advertisement checker 14 obtains the advertisement data obtained in step 10, reads the advertising management DB 11, and compares the advertisement data with the advertising management DB 11 (step 30). More specifically explained, the advertisement checker 14 checks to see whether the contents (the "product name", "sales copy", "price", and "posting expiration date" in this example) of the advertisement data, and the posting position match the contents (the "product name", "sales copy", "price", and "posting expiration date" in this example) of POP advertisement in the advertising management DB 11, and the POP positional information. In other words, the advertisement checker 14 determines whether or not the advertisement data conforms to the advertising management DB (step 40).

When negative determination (NO) is made in step 40, the abnormality notifier 15 notifies a worker that the POP advertisement, which is the base of the advertisement data obtained in step 10, has abnormality, in other words, the POP advertisement includes an inappropriate advertisement (step 50). In step 50, the abnormality notifier 15 causes the display device 107 to display the contents of the abnormality, and the contents and a specific technique related to the display will be described later. On the other hand, when positive determination (YES) is made in step 40, the flow proceeds to the next step 60.

Subsequently, the image analyzer 13 determines whether or not retrieval of all the advertisement data from the image of the shop has been completed (step 60). When negative determination (NO) is made in step 60, in other words, when another advertisement data is present in the image of the shop, the flow returns to step 20, and the processing is continued.

On the other hand, when positive determination (YES) is made in step 60, the advertisement checker 14 determines whether or not all the advertisements in the advertising management DB 11 have been checked (step 70). When negative determination (NO) is made in step 70, in other words, when there is no advertisement data corresponding to the POP advertisement in the advertising management DB 11, the abnormality notifier 15 notifies a worker that there is a POP advertisement which is not posted (step 80), and a series of processing is completed. In step 80, the abnormality notifier 15 causes the display device 107 to display the POP advertisement which is not posted, and the contents and a specific technique related to the notification will be described later. On the other hand, positive determination (YES) is made in step 70, a series of processing is completed.

In the exemplary embodiment, when a POP advertisement to be posted is posted at the right position for posting, positive determination (YES) is made in step 40. However, when a POP advertisement which is not to be posted is posted at the position not for posting, negative determination (NO) is made in step 40. In the exemplary embodiment, when a POP advertisement to be posted is not posted at the right position for posting, negative determination (NO) is made in step 70.

[Notification Screen for Inappropriate Advertisement]

The technique for displaying a notification on the display device 107 to notify a worker of an inappropriate advertisement in step 50 illustrated in FIG. 6 will be described. The advertising management DB illustrated in FIG. 4 11 is used for the description, and an example is discussed in which the processing illustrated in FIG. 6 was executed on 2018 Apr. 1. In the description, it is assumed that the price of chocolate pie registered in the advertising management DB illustrated in FIG. 4 11 is 278 (yen), and the price on an actually posted POP advertisement of the chocolate pie is 328 (yen).

(First Screen Example that Notifies of Inappropriate Advertisement)

FIG. 7 is a view illustrating a first screen example that notifies of inappropriate advertisements.

In the example illustrated in FIG. 7, inappropriate advertisements are presented as a list.

More specifically explained, in the example illustrated in FIG. 7, 'there were inappropriate pop labels' is displayed as the title. In the example illustrated in FIG. 7, the product names of inappropriate advertisements, the posting positions, and inappropriate items which are the reason why each advertisement is determined to be inappropriate are listed and displayed. For instance, in the "product name" of 'chocolate pie', "021-4" as the 'posting position' at which the POP advertisement is posted, and 'price' as the "inappropriate item" are displayed in association with each other. For instance, in the "product name" of 'cookie', "021-1" as the 'posting position' at which the POP advertisement is posted, and 'expired' as the "inappropriate item" are displayed in association with each other. The list can be printed with the printer 30 by clicking the "print listing" key displayed on the screen illustrated in FIG. 7.

(Second Screen Example that Notifies of Inappropriate Advertisement)

Figure 8:
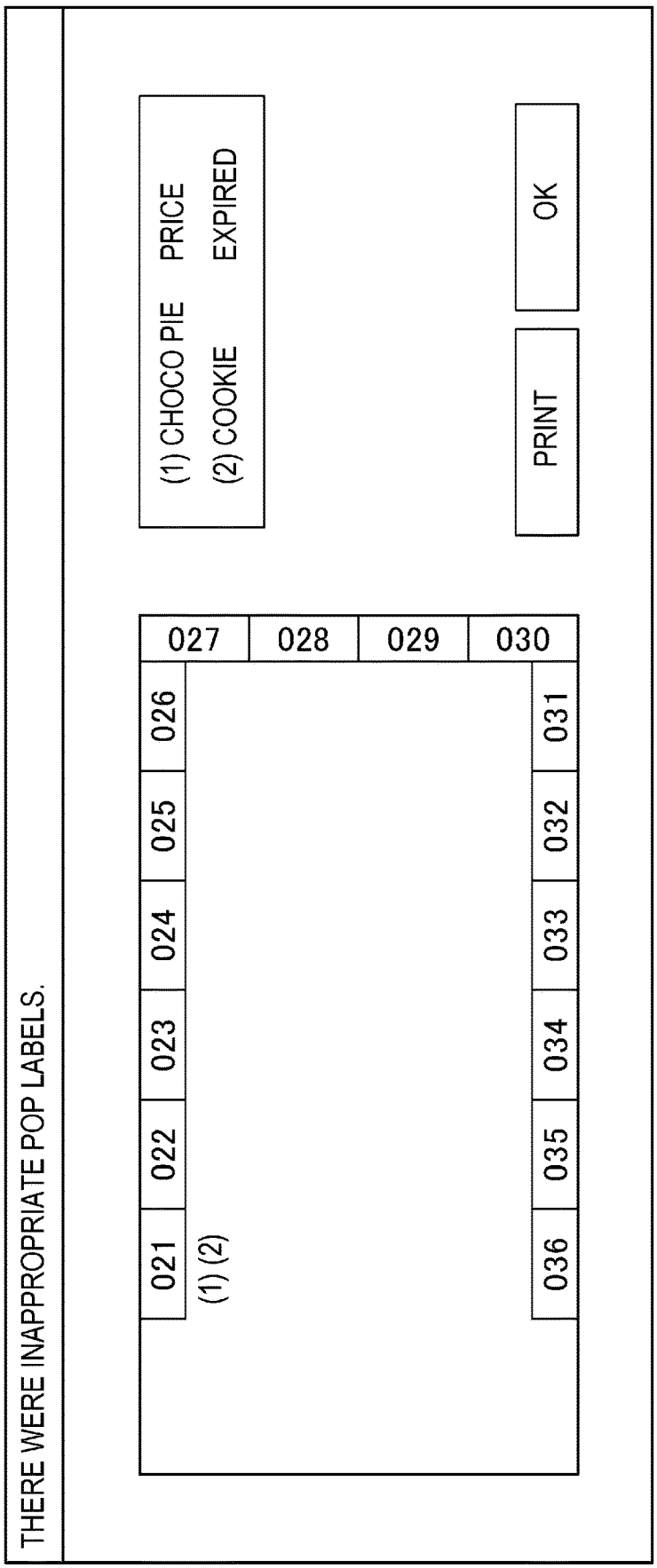
FIG. 8 is a view illustrating a second screen example that notifies of inappropriate advertisements.

FIG. 8 is a view illustrating a second screen example that notifies of inappropriate advertisements.

In the example illustrated in FIG. 8, inappropriate advertisements along with the posting positions are presented superimposed on a map of a shop.

More specifically explained, in the example illustrated in FIG. 8, 'there were inappropriate pop labels' is displayed as the title. In the example illustrated in FIG. 8, the product names of inappropriate advertisements and the inappropriate items are displayed along with a number individually assigned to each product on the right side of FIG. 8, and the number is displayed along with a map of the shop on the left side of FIG. 8. In the example illustrated in FIG. 8, '(1) Chocolate pie, price' and '(2) Cookie, expired' are displayed on the right side of FIG. 8, and (1), (2) each a number assigned to an inappropriate advertisement are displayed along with the posting position of the POP advertisement on the left side of FIG. 8. The contents displayed on the screen illustrated in FIG. 8 can be printed with the printer 30 by clicking the 'print' key displayed on the screen.

(Third Screen Example that Notifies of Inappropriate Advertisement)

FIG. 9 is a view illustrating a third screen example that notifies of inappropriate advertisements.

In the example illustrated in FIG. 9, inappropriate advertisements along with the posting positions are presented superimposed on the image of the shop captured by the imaging device 20.

More specifically explained, in the example illustrated in FIG. 9, 'there were inappropriate pop labels' is displayed as the title. In the example illustrated in FIG. 9, the product names of inappropriate advertisements and the inappropriate items are displayed along with numbers each individually assigned to a corresponding product on the right side of FIG. 9, and the numbers and their frames are displayed along with the image of the shop on the left side of FIG. 9. In the example illustrated in FIG. 9, '(1) Chocolate pie, price' and '(2) Cookie, expired' are displayed on the right side of FIG. 9, and (1), (2) each a number assigned to an inappropriate advertisement and a frame surrounding each POP advertisement are displayed on the left side of FIG. 9 along with the image of the shop, including the showcase 021, captured by the first monitoring camera 20a of the imaging device 20. The contents displayed on the screen illustrated in FIG. 9 can be printed with the printer 30 by clicking the 'print' key displayed on the screen.

(Screen Example that Proposes to Re-Print Inappropriate Advertisement)

When an inappropriate advertisement as described above is present, it is preferable to remove the inappropriate POP advertisement and post a new POP advertisement with the contents corrected. In the exemplary embodiment, in the posting management processing illustrated in FIG. 6, when an inappropriate advertisement is determined to be present, the advertisement checker 14 is designed to propose to print a POP advertisement for replacement. In the advertising management DB 11 illustrated in FIG. 4, an example is given in which the "posting expiration date" of a POP advertisement of 'cookie' as the "product name" is expired, and accordingly, the "posting expiration date" of the POP advertisement of 'cookie' as the "product name" is updated from "2018/3/31" to "2018/05/31", and the "design set" is changed from "special sale" to "normal sale".

FIG. 10 is a view illustrating a screen example that proposes to print POP advertisements for replacement.

In the example illustrated in FIG. 9, inappropriate advertisements are presented as a list.

More specifically explained, in the example illustrated in FIG. 10, 'Please print the following pop labels' is displayed as the title. In the example illustrated in FIG. 10, the product names of inappropriate advertisements, the POP specifications, and the design sets are listed and displayed along with numbers each individually assigned to a corresponding product. These POP specifications and design sets are read from updated advertising management DB 11. For instance, in the "product name" of 'chocolate pie', '(1)' as the "number", 'A4×1, A5×3' as the POP specification, and 'normal sale' as the "design set" are displayed in association with each other. For instance, in the "product name" of 'cookie', '(2)' as the "number", 'A5H×4' as the POP specification, and 'normal sale' as the "design set" are displayed in association with each other. The POP advertisements for replacement of 'chocolate pie' and 'cookie' can be printed with the printer 30 by clicking the 'print' key displayed on the screen illustrated in FIG. 10.

(Screen Example that Notifies of Unnecessary Advertisement)

FIG. 11 is a view illustrating a screen example that notifies of unnecessary advertisements. For instance, when a POP advertisement of chocolate pie and a POP advertisement of cookie are posted at the sales counter of chocolate pie, the 'unnecessary advertisement' refers to the POP advertisement of cookie.

In the example illustrated in FIG. 11, unnecessary advertisements along with the posting positions are displayed superimposed on a map of the shop.

More specifically explained, in the example illustrated in FIG. 11, 'There were unnecessary pop labels' is displayed as the title. In the example illustrated in FIG. 11, the product names of unnecessary advertisements are displayed on the right side of FIG. 11 along with numbers each individually assigned to a corresponding product, and the numbers are displayed on the left side of FIG. 11 along with a map of the shop. In the example illustrated in FIG. 11, '(1) Furikake' and '(2) Yakitori' are displayed on the right side of FIG. 11, and (1), (2) the numbers each assigned to an unnecessary advertisement are displayed along with the posting position of each unnecessary POP advertisement. The contents displayed on the screen illustrated in FIG. 11 can be printed with the printer 30 by clicking the 'print' key displayed on the screen.

(Screen Example that Notifies of Incorrect Advertisement)

FIG. 12 is a view illustrating a screen example that notifies of an incorrect advertisement. For instance, when a POP advertisement of cookie is posted instead of a POP advertisement of chocolate pie at the sales counter of chocolate pie, the "incorrect advertisement" refers to the POP advertisement of cookie.

In the example illustrated in FIG. 12, an incorrect advertisement along with the posting position is displayed superimposed on a map of the shop.

More specifically explained, in the example illustrated in FIG. 12, 'There was incorrect pop label. Please change the following pop label.' is displayed as the title. In the example illustrated in FIG. 12, the product name of an incorrect advertisement is displayed on the right side of FIG. 12 along with a number individually assigned to a corresponding product, and the number is displayed on the left side of FIG. 12 along with a map of the shop. In the example illustrated in FIG. 12, '(1) Gyoza skin' is displayed on the right side of FIG. 12, and (1), the number assigned to the incorrect advertisement is displayed along with the posting position of the POP advertisement. The contents displayed on the screen illustrated in FIG. 12 can be printed with the printer 30 by clicking the 'print' key displayed on the screen.

[Notification Screen for Advertisement not Posted]

Next, the technique for displaying a notification on the display device 107 to notify a worker of an advertisement not posted in step 80 illustrated in FIG. 6 will be described.

(Screen Example that Notifies of Advertisement not Posted)

Figure 13:
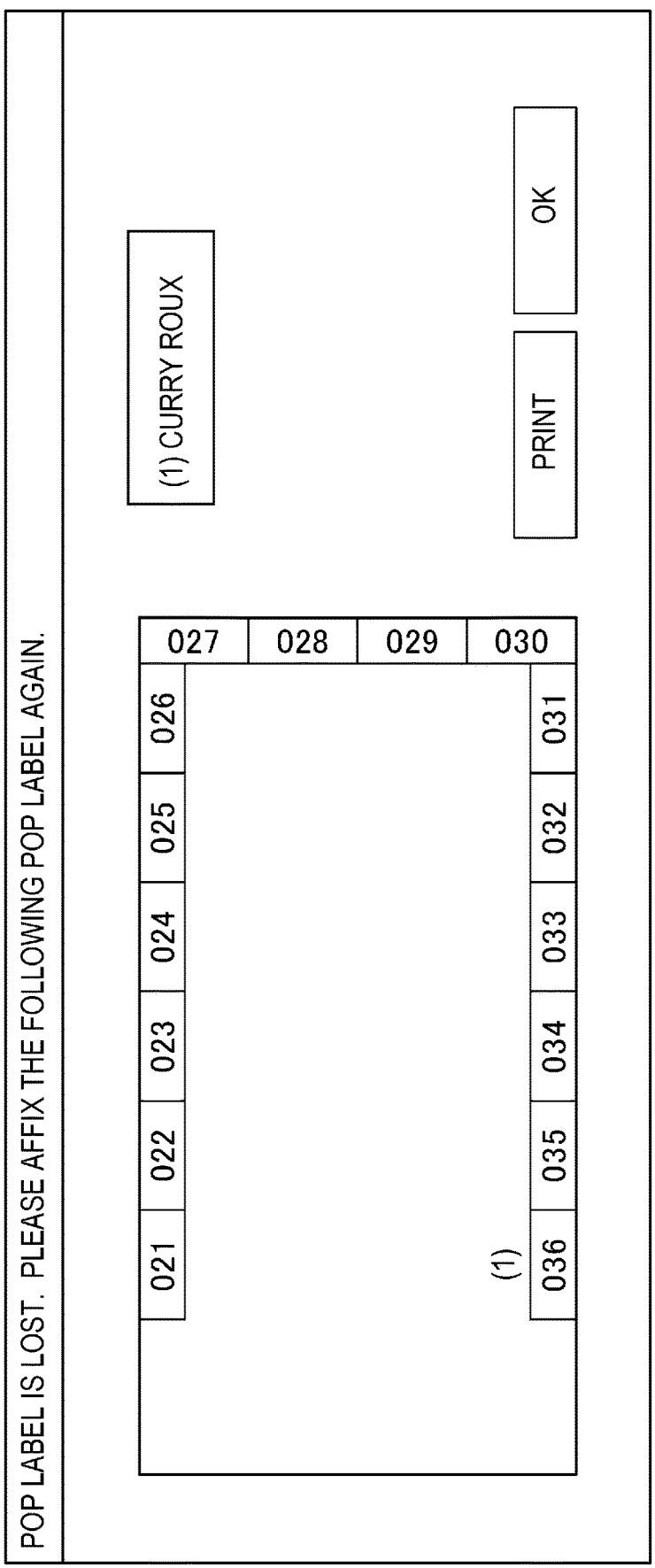
FIG. 13 is a view illustrating a screen example that notifies of an advertisement not posted.

FIG. 13 is a view illustrating a screen example that notifies of an advertisement not posted. The 'advertisement not posted' includes an advertisement which is originally not posted, and an advertisement which was posted before but is no longer posted for some reasons. Here, a description is given under the assumption that the latter case holds for an advertisement not posted, in other words, the advertisement not posted is a 'lost advertisement'.

In the example illustrated in FIG. 13, the advertisement not posted along with the posting position is displayed superimposed on a map of the shop.

More specifically explained, in the example illustrated in FIG. 13, 'Pop label is lost. Please affix the following pop label again.' is displayed as the title. In the example illustrated in FIG. 13, the product name of a lost advertisement is displayed on the right side of FIG. 13 along with a number individually assigned to a corresponding product, and the number is displayed on the left side of FIG. 13 along with a map of the shop. In the example illustrated in FIG. 13, '(1) Curry roux' is displayed on the right side of FIG. 13, and (1), the number assigned to the lost advertisement is displayed along with the posting position of the POP advertisement. The contents displayed on the screen illustrated in FIG. 13 can be printed with the printer 30 by clicking the 'print' key displayed on the screen.

[Notification Screen for Advertisement in Abnormal Posted State]

In the POP advertisement posting management processing illustrated in FIG. 6, when a POP advertisement to be posted is posted at the right position for posting, notification is not particularly performed. However, even when a POP advertisement to be posted is posted at the right position for posting, if an abnormal posted state is found, it is preferable to notify of the abnormality.

Hereinafter, the technique for displaying a notification on the display device 107 to notify a worker of an advertisement in an abnormal posted state will be described.

[Screen Example that Notifies of Advertisement Posted Improper Manner]

FIG. 14 is a view illustrating a screen example that notifies of an advertisement posted in an improper manner. The 'advertisement posted in an improper manner' includes a POP advertisement such that although the POP advertisement to be posted is posted at the positon for posting, the POP advertisement is bent or posted upside down.

In the example illustrated in FIG. 14, an advertisement posted in an improper manner along with the posting position is presented superimposed on the image of the shop captured by the imaging device 20.

More specifically explained, in the example illustrated in FIG. 14, 'Pop label is tilted. Please affix the pop label again.' is displayed as the title. In the example illustrated in FIG. 14, the product name of an advertisement posted in an improper manner is displayed along with a number individually assigned to a corresponding product on the right side of FIG. 14, and the number and its frame are displayed along with the image of the shop on the left side of FIG. 14. In the example illustrated in FIG. 14, '(1) Chocolate pie' is displayed on the right side of FIG. 14, and (1), the number assigned to the advertisement posted in an improper manner and a frame surrounding the POP advertisement are displayed on the left side of FIG. 14 along with the image of the shop, including the showcase 021, captured by the first monitoring camera 20a of the imaging device 20. The contents displayed on the screen illustrated in FIG. 14 can be printed with the printer 30 by clicking the 'print' key displayed on the screen.

[Screen Example that Notifies of Damaged Advertisement]

Figure 15:
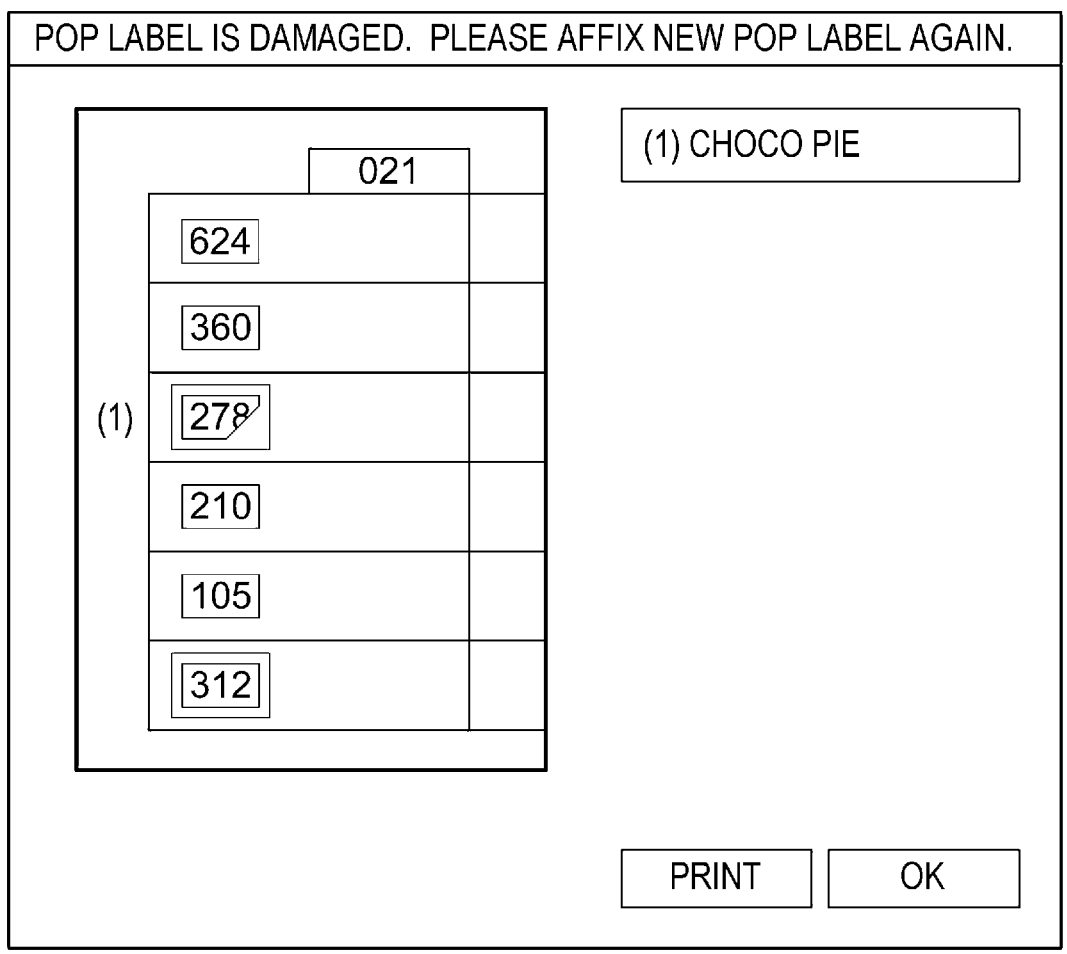
FIG. 15 is a view illustrating a screen example that notifies of a damaged advertisement.

FIG. 15 is a view illustrating a screen example that notifies of a damaged advertisement. The 'damaged advertisement' includes a POP advertisement such that although the POP advertisement to be posted is posted at the positon for posting, the POP advertisement is broken or cut.

In the example illustrated in FIG. 15, a damaged advertisement along with the posting position is presented superimposed on the image of the shop captured by the imaging device 20.

More specifically explained, in the example illustrated in FIG. 15, 'Pop label is damaged. Please affix new pop label again.' is displayed as the title. In the example illustrated in FIG. 15, the product name of a damaged advertisement is displayed along with a number individually assigned to a corresponding product on the right side of FIG. 15, and the number and its frame are displayed along with the image of the shop on the left side of FIG. 15. In the example illustrated in FIG. 15, '(1) Chocolate pie' is displayed on the right side of FIG. 15, and (1), the number assigned to the damaged advertisement and a frame surrounding the POP advertisement are displayed on the left side of FIG. 15 along with the image of the shop, including the showcase 021, captured by the first monitoring camera 20a of the imaging device 20. The contents displayed on the screen illustrated in FIG. 15 can be printed with the printer 30 by clicking the 'print' key displayed on the screen.

[Others]

In the exemplary embodiment, posting management processing is executed by one information processing device 10. However, this is not always the case. For instance, two or more information processing devices 10 may be prepared, and various types of processing may be shared and executed by the multiple information processing devices.

Although the first monitoring camera 20a to the third monitoring camera 20c arranged in a shop in a fixed manner are used as the imaging device 20 in the exemplary embodiment, this is not always the case. For instance, a self-moving imaging device 20 equipped with a camera and a transportation unit may be used, and the image of a shop may be captured while moving the imaging device 20. Alternatively, a worker holding the imaging device 20 may capture the image of a shop while moving around the shop.

Furthermore, in the exemplary embodiment, advertisement data is retrieved from the image of a shop captured by the imaging device 20. However, this is not always the case. For instance, an identification device such as an IC tag is attached to each POP advertisement posted in a shop, and advertisement data may be retrieved from identification information obtained by receiving identification signals from each identification device.

Although a description of an example has been given where POP advertisements as an example of articles for posting are managed in the exemplary embodiment, without being limited to this, the exemplary embodiment is also applicable to management of general posted articles on which a sales copy or a price is not listed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An article-for-posting management system comprising:
   a storage unit that stores advertisement data, the advertisement data including a description of an advertisement and a position at which the advertisement is intended to be posted, and the description of the advertisement being stored in association with the position;
   an imaging system comprising a plurality of cameras positioned in different directions, each camera being configured to capture a first image of the advertisement that has been posted and a second image of an area where the advertisement is allowed to be posted, the first image and the second image captured by each camera being relative to a direction towards which each respective camera is positioned;
   an image analyzer that receives the first image captured by each of the plurality of cameras via a transmission from each camera, and performs image analysis on the first image;
   an obtaining unit that obtains, from the image analyzer, a position at which the advertisement is currently posted; and
   an output unit that:
      outputs the second image in association with the description of the advertisement, when there is a difference between the position stored by the storage unit and the position obtained by the obtaining unit, from the image analyzer; and
      outputs a proposal to prompt posting of the advertisement that is intended to be posted, when the advertisement that is intended to be posted is not the advertisement that is currently posted.

2. The article-for-posting management system according to claim 1,
   wherein the output unit outputs the proposal by which the advertisement is associated with the position at which the advertisement is intended to be posted.

3. The article-for-posting management system according to claim 2,
   wherein the output unit outputs the proposal by which the advertisement is associated with the second image of the area where the advertisement for posting is allowed to be posted.

4. The article-for-posting management system according to claim 1,
   wherein when the advertisement that is intended to be posted is not the advertisement that is currently posted, the output unit outputs a proposal to prompt removal of the advertisement.

5. The article-for-posting management system according to claim 4,
   wherein the output unit outputs the proposal by which the advertisement is associated with the position at which the advertisement is intended to be posted.

6. The article-for-posting management system according to claim 5,
   wherein the output unit outputs the proposal by which the advertisement is associated with the second image of the area where the advertisement for posting is allowed to be posted.

7. The article-for-posting management system according to claim 1,
   wherein when the advertisement that is intended to be posted is the advertisement that is currently posted, but a posted state of the advertisement is a state in which the advertisement is posted improperly or is damaged, the output unit outputs a proposal to re-post the advertisement.

8. The article-for-posting management system according to claim 7,
wherein the output unit outputs the proposal by which the advertisement is associated with the position at which the advertisement is intended to be to be posted.

9. The article-for-posting management system according to claim 8,
wherein the output unit outputs the proposal by which the advertisement is associated with second image of the area where the advertisement is allowed to be posted.

10. A non-transitory computer readable medium storing a program causing a computer to execute a process for implementing functions of the process comprising:
storing, by a storage unit, advertisement data, the advertisement data including a description of an advertisement and a position at which the advertisement is intended to be posted, and the description of the advertisement being stored in association with the position;
capturing, by each camera of a plurality of cameras in an imaging system, a first image of the advertisement that has been posted and a second image of an area where the advertisement is allowed to be posted, the first image and the second image captured by each camera being relative to a direction towards which each respective camera is positioned;
receiving, by an image analyzer, the first image captured by each of the plurality of cameras via a transmission from each camera, and performing image analysis on the first image;
obtaining, from the image analyzer, a position at which the advertisement is currently posted;
when there is a difference between the position stored by the storage unit and the position obtained from the image analyzer, outputting the second image in association with the description of the advertisement; and
when the advertisement that is intended to be posted is not the advertisement that is currently posted, outputting a proposal to prompt posting of the advertisement data that is intended to be posted.

11. An article-for-posting management system comprising:
storage means for storing advertisement data, the advertisement data including a description of an advertisement and a position at which the advertisement is intended to be posted, and the description of the advertisement being stored in association with the position;
an imaging system comprising a plurality of cameras positioned in different directions, each camera being configured to capture a first image of the advertisement that has been posted and a second image of an area where the advertisement is allowed to be posted, the first image and the second image captured by each camera being relative to a direction towards which each respective camera is positioned;
an image analyzer that receives the first image captured by each of the plurality of cameras via a transmission from each camera, and performs image analysis on the first image;
obtaining means for obtaining, from the image analyzer, a position at which the advertisement is currently posted; and
output means for:
outputting the second image in association with the description of and the advertisement, when there is a difference between the position stored by the storage means and the position obtained by the obtaining means, from the image analyzer; and
outputting a proposal to prompt posting of the advertisement that is intended to be posted, when the advertisement that is intended to be posted is not the advertisement that is currently posted.

* * * * *